Oct. 10, 1961
W. R. WINTER
SAFETY CIRCUITS FOR ELECTRIC MOTORS
DRIVING REFRIGERANT COMPRESSORS
Original Filed July 31, 1957
Re. 25,049
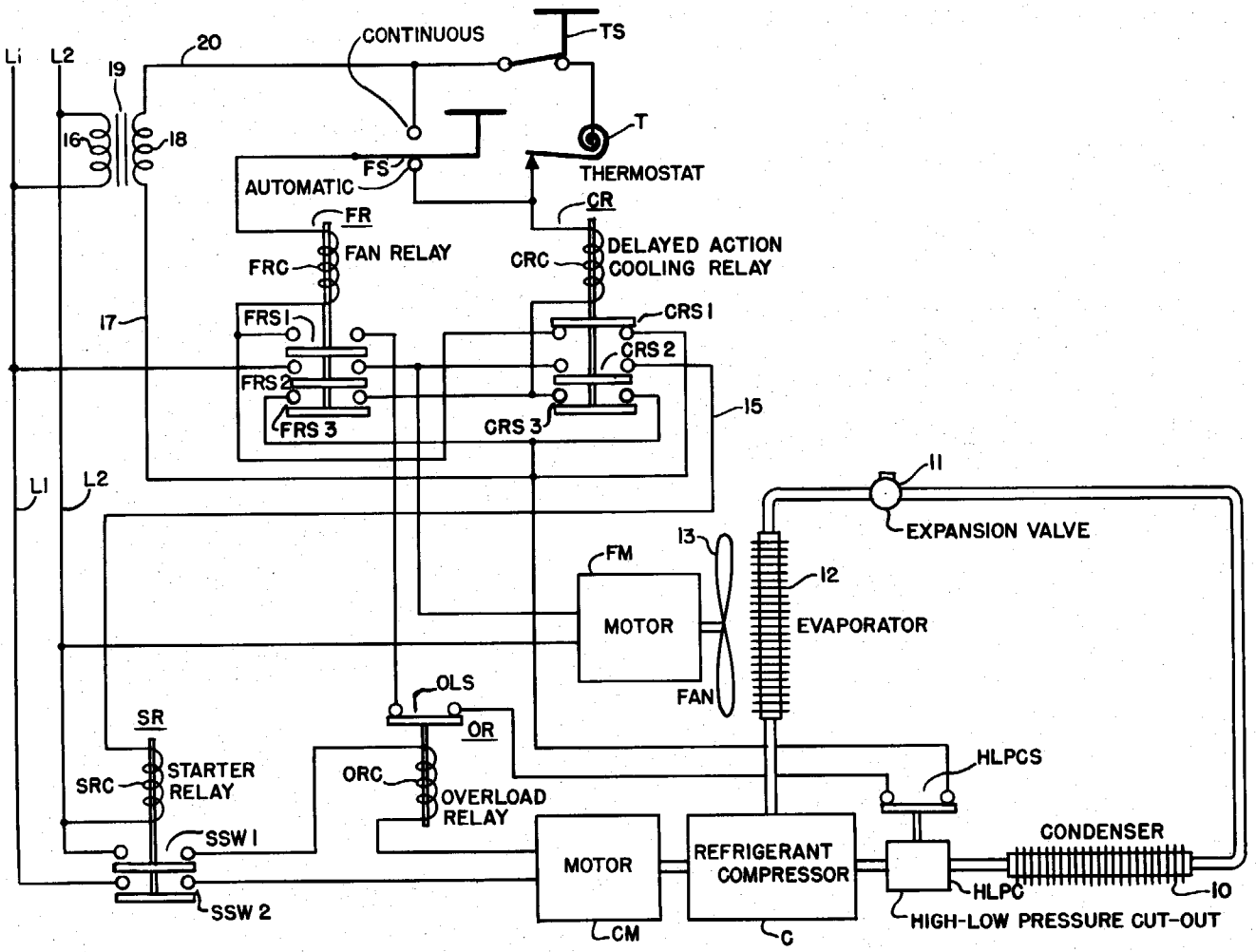
WILLIAM R. WINTER
INVENTOR
BY Robert J. Palmer
ATTORNEY United States Patent Office Re. 25,049
Reissued Oct. 10, 1961

25,049

SAFETY CIRCUITS FOR ELECTRIC MOTORS DRIVING REFRIGERANT COMPRESSORS

William R. Winter, Staunton, Va., assignor to Westinghouse Electric Corporation, East Pittsburgh, Pa., a corporation of Pennsylvania Original No. 2,891,386, dated June 23, 1959, Ser. No. 675,374, July 31, 1957. Application for reissue Nov. 9, 1959, Ser. No. 851,928
6 Claims. (Cl. 62—163)

Matter enclosed in heavy brackets [ ] appears in the original patent but forms no part of this reissue specification; matter printed in italics indicates the additions made by reissue.

This invention relates to safety controls for electric motors which drive refrigerant compressors in air conditioning systems and apparatus.

Refrigerant compressors used for air conditioning usually have safety switches such as high and low pressure cut-outs and overload relays. A high pressure cut-out may deenergize the electric motor driving a refrigerant compressor as when a temporary failure occurs in the water supply used for cooling the associated condenser or when the water pressure falls too low for satisfactory condenser cooling. A low pressure cut-out may deenergize the motor when the unit has operated continuously for a long period of time when the space served has dropped to a low temperature or humidity or both. A temporary drop in the voltage of the power supply may cause an overload relay to deenergize the motor.

Automatic resetting of the safety controls, or automatic restarting of the motor is not practical for if this were done, the unit might operate intermittently without anyone being aware there was a legitimate reason for the operation of one or more of the safety controls.

Such an air conditioning unit usually has a room or zone thermostat which is connected to a power source and to a cooling relay in the energizing circuit of the compressor motor. A fan relay is also usually provided for energizing the motor of the fan which moves the air to be cooled over the evaporator coil of the unit, the thermostat also being in the energizing circuit of the fan relay.

This invention provides a push-button switch in series with such a room thermostat, which is simply opened and closed for restarting the associated compressor motor after a safety control has deenergized the motor. This restarting circuit fails safe if any wire to the thermostat is cut or shorted with any other wire.

An object of this invention is to improve the controls used for the restarting of the motors of refrigerant compressors after safety controls have deenergized such motors.

This invention will now be described with reference to the annexed drawing which is a circuit schematic of one embodiment of the invention.

A refrigerant compressor C driven by an electric motor CM, circulates refrigerant through a conventional high-low pressure cut-out HLPC, a condenser coil 10, an expansion valve 11 and an evaporator coil 12.

The compressor motor CM is energized through coil ORC of overload relay OR, and switches SSW1 and SSW2 of starter relay SR from electric supply lines L1 and L2. The starter relay coil SRC is connected at one end to L2 and at its other end through wire 15, switch CRS2 of cooling relay CR and switch FRS2 of fan relay FR to line L1.

A fan 13 is provided for moving the air to be cooled over the evaporator coil 12, and is driven by electric motor FM which is energized through the switch FRS2 of the fan relay FR from the supply lines L1 and L2.

A fan switch FS is provided for operating the fan 13 continuously, or automatically under control of the thermostat T. For automatic operation, it is placed in the lower position shown by the drawing where it connects the upper end of the fan relay coil FRC to the upper end of the cooling relay coil CRC.

A step-down transformer 19 has its primary winding 16 connected across electric supply lines L1 and L2, and has a secondary winding 18. When the fan switch FS is in its lower position, it is in a series circuit including the thermostat switch TS, wire 20, transformer winding 18, wire 17, normally closed switch CRS1 of the cooling relay CR, and winding FRC of fan relay FR. When the thermostat T calls for cooling, it closes this circuit and energizes the fan relay FR.

The fan relay FR has a normally open switch FRS1 connected in a series circuit including the safety switches OLS and HLPCH, wire 17, winding 18, wire 20, switch TS, thermostat T, fan switch FS and fan relay coil FRC. When the fan relay FR is energized, the switch FRS1 is closed, and the fan relay FR remains energized after the switch CRS1 of the cooling relay is opened by the cooling relay CR being energized provided that the safety switches are closed.

The fan relay has another switch FRS3 connected in series with the cooling relay coil CRC, the thermostat T, the thermostat switch TS, the wire 20, the winding 18 and the wire 17. The cooling relay CR is energized by the closing of this circuit when the fan relay FR is energized. The cooling relay has a switch CRS3 connected across the fan relay switch FRS3, and which maintains the cooling relay energized after the fan relay is deenergized.

The fan relay FR has another switch FRS2 which is connected in series with switch CRS2 of the cooling relay CR, the coil SRC of the starter relay SR and lines L1 and L2, and when FRS2 and CRS2 are closed, the starter relay SR is energized and starts the compressor motor CM. The switch FRS2 is also connected in series with the fan motor M and the supply lines L1 and L2, and starts the fan motor when the fan relay is energized.

The fan switch has an upper contact legended "Continuous," which is connected in series with wire 20, winding 18, normally closed switch CRS1 of the cooling relay CR, the fan relay winding FRC and the switch FS, and when the fan switch FS is against its upper contact, the fan relay is energized and energizes the fan motor FM.

Assume that the thermostat switch TS is closed, the fan switch FS is in its lower position for automatic operation, and the thermostat T calls for cooling. The fan relay FR is energized through normally closed switch CRS1 of the cooling relay CR, wire 17, one end of the secondary winding 18, wire 20, the thermostat switch TS, thermostat T and the other end of the winding 18, this circuit also including the fan switch FS. The fan relay FR closes its normally open switches FRS1, FRS2 and FRS3. The switch FRS3 is connected in parallel with switch CRS3 of the cooling relay CR, both FRS3 and CRS3 being connected in series with the cooling relay coil CRC, the thermostat T, the thermostat switch TS, the wire 20, the transformer secondary 18 and the wire 17. The cooling relay thus is energized after the fan relay is energized.

When the cooling relay CR is energized, it opens its formerly closed switch CRS1 which energized the fan relay FR at the start. However, when the fan relay FR was energized, it closed its switch FRS1 which is in series with the safety switches OLS and HLPCS, wire 17, transformer secondary 18, wire 20, switch TS, thermostat T, fan switch FS and fan relay coil FRC, maintaining the fan relay energized as long as both of the safety switches are closed.

When the cooling relay is energized, it also closes its switch CRS2 which is connected in series with the now closed switch FRS2 of the fan relay FR, the coil SRC of the starter relay SR, and lines L1 and L2, starting the compressor motor CM. The closing of the fan relay switch FRS2 also connects the fan motor FM to the supply lines L1 and L2, starting the fan motor.

Assume now that one of the series-connected safety switches HLPCS or OLS has opened, deenergizing the fan relay FR. Its switch FRS2 is opened and stops the fan and compressor motors. The cooling relay CR is not deenergized at this time since its now closed switch CRS3 maintains it energized after the parallel-connected switch FRS3 of the fan relay has opened. By so maintaining the cooling relay energized, it cannot close its switch CRS1 to again energize the fan relay and cause cycling.

The safety switch which deenergized the compressor and fan motors may reclose but the fan relay remains deenergized since the cooling relay switch CRS1 which energized it at the start is now open, and the fan relay switch FRS1 which energized it after CRS1 opened, is now open.

To restart the fan and compressor motors, assuming that the safety switch that opened has now closed, the push-button TS is momentarily opened and then closed. Opening TS causes the cooling relay CR to be deenergized and to again close its switch CRS1 to again energize the fan relay FR. The latter closes its switch FRS1 which in series with the safety switches, maintains it energized after the cooling relay is energized and opens its switch CRS1. The cooling relay is energized by the closing of the fan switch FRS3, and closes its switch CRS2 which, with the closed fan relay switch FRS2, starts the compressor motor CM. The closing of FRS2 also starts the fan motor so that the unit is now back in operation.

The fan relay must always be energized before the cooling relay is energized. Preferably, this is accomplished by having a fan relay switch energize the cooling relay as described in the foregoing, but it could be accomplished by using a delayed action cooling relay.

When the fan switch FS is set at "Continuous," the fan relay is energized directly from wire 20 instead of through the thermostat T, so that the fan can be operated for ventilation when refrigerative cooling is not required.

The foregoing description applies to the restarting of the fan and compressor motors when a temporary abnormal condition has caused a safety switch to stop the motors. If there is anything wrong with the unit that requires correction, this will be indicated by the frequent requirement for restarting so that corrective action can be taken.

What is claimed, is:

[1. A control circuit for an electric motor driving a refrigerant compressor of an air conditioning unit, said compressor having a safety switch responsive to refrigerant pressure, said motor having a starter relay with a switch for connecting said motor to an electric power source, and having an overload relay with an energizing coil connected between said starter relay switch and said motor, said overload relay having a switch which is opened when said coil is energized by excessive current drawn by said motor, said unit having a fan for moving air to be cooled, having an electric motor for driving said fan, and having a thermostat for starting said motors when cooling is required, said circuit comprising a cooling relay having an energizing coil, said relay having a first switch that is closed when said relay is deenergized and having a second switch that is closed when said relay is energized, a fan relay having an energizing coil and having first and second switches that are closed when said fan relay is energized, a thermostat switch means connecting said thermostat, said thermostat switch, said fan relay coil and said first switch of said cooling relay in series and to said source for energizing said fan relay, means connecting said thermostat switch, said thermostat, said cooling relay coil and said second switch of said fan relay in series and to said source for energizing said cooling relay after said fan relay is energized, said cooling relay when energized opening said first cooling relay switch, means connecting said safety switch, said overload relay switch, said fan relay coil and said first fan relay switch in series and to said source for maintaining said fan relay energized while said safety switch and said overload relay switch are closed, and means connecting said fan motor and said second fan relay switch in series and to said power source for starting said fan motor when said fan relay is energized.]

[2. A control circuit as claimed in claim 1 in which said means connecting said thermostat switch, said thermostat, said cooling relay coil and said second switch of said fan relay in series for energizing said cooling relay, includes third switches on said fan and cooling relays, said third switches being connected in parallel with each other and in series with said cooling relay.]

[3. A control circuit as claimed in claim 2 in which the means connecting with said fan relay and said cooling relay to said source comprises the secondary winding of a stepdown transformer having a primary winding connected to said source.]

[4. A control circuit as claimed in claim 1 in which the means connecting said fan relay and said cooling relay to said source comprises the secondary winding of a stepdown transformer having a primary winding connected to said source.]

*5. In a control circuit for a refrigeration system having air cooling means, a fan, an electric motor for driving said fan, a safety switch which opens in response to an abnormal condition in said system, an electric supply circuit, and a magnetic starter having switching means for operating said air cooling means from said supply circuit, the improvement comprising a first switch which is closed when said system is not operating, second, third and fourth switches which are open when said system is not operating, means for closing said third and fourth switches, a reset switch, means including said reset and first switches for operating said switch closing means from said supply circuit, means for closing said second switch and opening said first switch, means including said reset switch for operating said last mentioned means from said supply circuit after said third and fourth switch closing means has operated, means including said reset, third and safety switches for operating said third and fourth switch closing means from said supply circuit after said first switch has opened, means including said second and fourth switches for operating said starter from said supply circuit, and means including said fourth switch for operating said fan motor from said supply circuit.*

*6. In a control circuit for a refrigeration system having air cooling means, a fan, an electric motor for driving said fan, a safety switch which opens in response to an abnormal condition in said system, an electric supply circuit, a magnetic starter having switching means for operating said air cooling means from said supply circuit, and a thermostat for starting and stopping said air cooling means, the improvement comprising a first switch which is closed when said system is not operating, second, third and fourth switches which are open when said system is not operating, means for closing said third and fourth switches, a reset switch, means including said thermostat and said reset and first switches for operating said switch closing means from said supply circuit, means for closing said second switch and opening said first switch, means including said thermostat and said reset switch for operating said last mentioned means from said supply circuit after said third and fourth switch closing means has operated, means including said thermostat and said reset, third and safety switches for operating said third and fourth switch closing means from said supply circuit after said first switch has opened, means including said second and fourth switches for operating said starter from said supply circuit, and means including said fourth switch for operating said fan motor from said supply circuit.*

*7. In a control circuit for a refrigeration system having*

*air cooling means, a fan, an electric motor for driving said fan, a safety switch which opens in response to an abnormal condition in said system, an electric supply circuit, and a magnetic starter having switching means for operating said air cooling means from said supply circuit, the improvement comprising a cooling relay having a first switch which is closed until said cooling relay has operated and having a second switch which is closed when said cooling relay has operated, a fan relay having third and fourth switches which are closed when said fan relay has operated, a reset switch, means including said reset and first switches for operating said fan relay from said supply circuit, means including said reset switch for operating said cooling relay from said supply circuit after said fan relay has operated, means including said reset, safety and third switches for operating said fan relay from said supply circuit after said cooling relay has operated and has opened said first switch, means including said second and fourth switches for operating said starter from said supply circuit, and means including said fourth switch for operating said fan motor from said supply circuit.*

*8. In a control circuit for a refrigeration system having air cooling means, a fan, an electric motor for driving said fan, a safety switch which opens in response to an abnormal condition in said system, an electric supply circuit, a magnetic starter having switching means for operating said air cooling means from said supply circuit, and a thermostat for starting and stopping said air cooling means, the improvement comprising a cooling relay having a first switch which is closed until said cooling relay has operated and having a second switch which is closed when said cooling relay has operated, a fan relay having third and fourth switches which are closed when said fan relay has operated, a reset switch, means including said thermostat and said reset and first switches for operating said fan relay from said supply circuit, means including said thermostat and said reset switch for operating said cooling relay from said supply circuit after said fan relay has operated, means including said thermostat and said reset, safety and third switches for operating said fan relay from said supply circuit after said cooling relay has operated and opened said first switch, means including said second and fourth switches for operating said starter from said supply circuit, and means including said fourth switch for operating said fan motor from said supply circuit.*

*9. In a control circuit for air cooling means, a safety switch which opens in response to an abnormal condition in said system, an electric supply circuit, and a magnetic starter having switching means for operating said air cooling means from said supply circuit, the improvement comprising a first switch which is closed when said system is not operating, second, third and fourth switches which are open when said system is not operating, means for closing said third and fourth switches, a reset switch, means including said reset and first switches for operating said switch closing means from said supply circuit, means for closing said second switch and opening said first switch, means including said reset switch for operating said last mentioned means from said supply circuit after said third and fourth switch closing means has operated, means including said reset, third and safety switches for operating said third and fourth switch closing means from said supply circuit after said first switch has opened and means including said second and fourth switches for operating said starter from said supply circuit.*

*10. In a control circuit for a refrigeration system having air cooling means, a safety switch which opens in response to an abnormal condition in said system, an electric supply circuit, and a magnetic starter having switching means for operating said air cooling means from said supply circuit, the improvement comprising a cooling relay having a first switch which is closed until said cooling relay has operated and having a second switch which is closed when said cooling relay has operated, a second relay having third and fourth switches which are closed when said second relay has operated, a reset switch, means including said reset and first switches for operating said second relay from said supply circuit, means including said reset switch for operating said cooling relay from said supply circuit after said second relay has operated, means including said reset, safety and third switches for operating said second relay from said supply circuit after said cooling relay has operated and has opened said first switch and means including said second and fourth switches for operating said starter from said supply circuit.*

References Cited in the file of this patent or the original patent

UNITED STATES PATENTS

| | | |
|---|---|---|
| 2,451,385 | Groat | Oct. 12, 1948 |
| 2,544,592 | Feinberg | Mar. 6, 1951 |
| 2,697,195 | Courtney | Dec. 14, 1954 |
| 2,818,535 | Skeats | Dec. 31, 1957 |
| 2,898,746 | Mobarry | Aug. 11, 1959 |